United States Patent [19]
Siemssen

[11] 3,779,698
[45] Dec. 18, 1973

[54] MAKING OF DEVITRIFIED PELLETS
[75] Inventor: Ernst A. Siemssen, Gwynedd, Pa.
[73] Assignee: Selas Corporation of America, Dresher, Pa.
[22] Filed: June 14, 1972
[21] Appl. No.: 262,624

[52] U.S. Cl.................. 432/13, 252/378, 432/79
[51] Int. Cl............................................. F27b 1/02
[58] Field of Search .............. 432/13, 79; 252/378

[56] References Cited
UNITED STATES PATENTS
3,151,965  10/1964  Patterson............................ 432/13
3,427,367  2/1969  Kiehl.................................... 432/14
2,627,642  2/1953  Osborne......................... 252/378 R
3,627,285  12/1971  Siemssen............................ 432/13

Primary Examiner—John J. Camby
Attorney—E. Wellford Mason

[57] ABSTRACT

Method and apparatus for making a devitrified lightweight aggregate. Particles of clay or a similar bloatable material are dropped through a tower furnace and bloated to spherical aggregate which is collected and held at temperature until it has devitrified.

7 Claims, 1 Drawing Figure

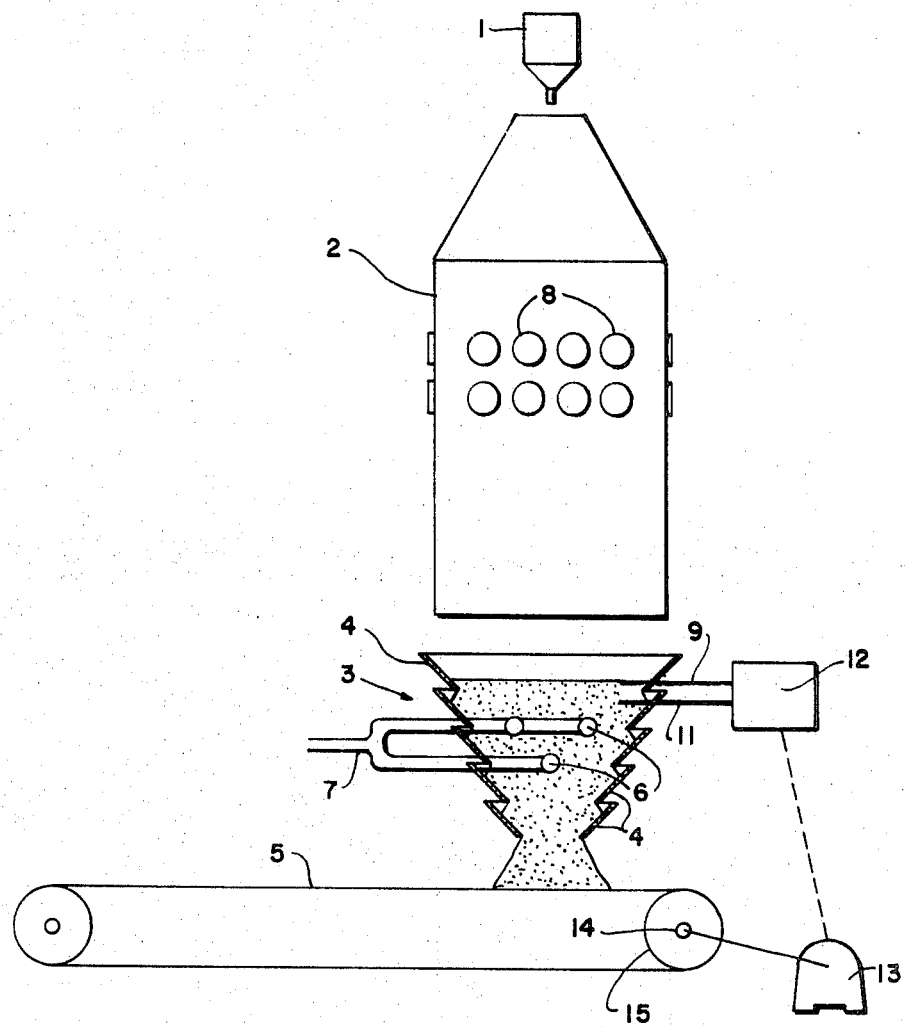

MAKING OF DEVITRIFIED PELLETS

BACKGROUND AND SUMMARY

The present invention relates to a method of preparing on a continuous basis devitrified and calcined aggregate. The art discloses a number of processes for producing lightweight aggregate from clay or a clay-like material. The particles of material produced by these processes are vitreous and have a glass-like nature. The particles of some materials, such as cordierite for example, have more strength and will withstand higher temperatures if they are devitrified.

It is an object of the invention to provide a method for producing devitrified aggregate continuously.

It is a further object of the invention to provide apparatus for the continuous production of devitrified aggregate.

The invention includes a tower furnace through which particles to be treated are dropped and a collection apparatus in which partially treated particles are held at temperature until treatment is completed. There is also provided a conveyor for carrying the treated particles to a point of use or storage at a rate coordinated with their rate of production.

The various features of novelty which characterize my invention are pointed out with particularity in the claims annexed to and forming a part of this specification. For a better understanding of the invention, however, its advantages and specific objects attained with its use, reference should be had to the accompanying drawings and descriptive matter in which I have illustrated and described a preferred embodiment of the invention.

IN THE DRAWINGS

The single FIGURE of drawing shows diagrammatically and partly in section apparatus with which the method can be performed.

DETAILED DESCRIPTION

Referring to the drawing, there is shown a supply hopper 1 from which material to be treated is supplied to the inlet of a tower furnace 2. This furnace is preferably of the type and operates in the same manner as that shown in Blaha U.S. Pat. No. 3,071,357 granted Jan. 1, 1963, which patent is incorporated herein by reference. The material discharged from the lower, open end of the furnace is collected as a column-like mass in a bin 3 comprising a series of concentric and axially displaced conical rings 4. These rings are lined with a material that will withstand the temperature of the particles collected therein, and are sized and mounted so that the axial spacing between them is such that material in an upper ring will not flow over the outer edge of the next lower ring.

Material discharged from the bottom ring is collected on a conveyor belt 5 and moved by the belt to the left away from the apparatus. The belt surface is located below the lowest ring, a distance such that the angle of repose of the material will let it build up in bin 3 until the belt is moved to carry some of the material away.

Cooling and oxidizing air or other gas is forced through the collected mass from a series of perforated pipes 6 that are supplied from a suitable source under pressure through pipe 7. The height of the material collected in bin 3 may be regulated by a conventional level control. This is shown herein as including an upper level probe 9 and a lower level probe 11 connected with a controller 12. As the level of the material in bin 3 rises and falls, controller 12 operates to start and stop a conveyor drive motor 13 which is connected to the shaft 14 of a conveyor drive roll 15.

In practicing the invention, clay or other material or combinations of materials that will bloat when heated, is formed into small particles of substantially uniform size and shape, and are supplied to hopper 1 to be dropped in a steady stream through furnace 2. The particles are preferably about 1/32 inch in diameter and from 1/16 to 1/8 inch long. The furnace is heated by burners 8 to a temperature of from 2,700° F to 2,900° F which is high enough to fuse and produce bloating of the individual particles as they fall through the furnace. The product produced at this point, as explained in the above-mentioned Blaha Patent, is a small, cellular sphere that has a glass-like or vitreous surface. By the time the particles leave the furnace and reach bin 3 they have cooled to about 2,000° F, which is cool enough so that they are no longer tacky on their surfaces and therefore will not stick together. The so-formed particles have many uses, particularly as lightweight aggregate. It has been found if the particles are calcined or devitrified they have additional uses.

Radiation from the bottom of the furnace to the top of bin 3 is sufficient to prevent the particles from cooling too rapidly. Thus, the particles will stay at a high enough temperature for devitrification to take place as they move downwardly in a column-like mass in the bin. The bin is of sufficient size so that the particles remain in the upper portion thereof long enough to devitrify before moving to the lower cooling zone of the column. As the particles continue to move lower they are cooled by air that can infiltrate into the mass between rings 4. Additional cooling is provided by air blown into the mass of particles through the perforations in pipes 6. This air also serves the purpose of oxidizing the particles to produce a calcining effect by burning out any carbonaceous material that may remain in them, thus helping further to increase their strength. By the time the particles reach the bottom of bin 3 they have cooled enough for handling and are crystalline in nature and are ready for use as a lightweight aggregate.

The aggregate particles are carried away from the bottom of bin 3 by belt 5 either continuously or intermittently. Motor 13 driving belt 5 can be adjusted to drive the belt so that aggregate will be moved from beneath the bin in the same amount that it is dropped through the furnace. If desired, however, the motor 13 can be controlled by level controller 12. In this case the motor will be started when aggregate reaches the level of upper probe 9 and stopped when it reaches the level of lower probe 11. With either mode of removing the aggregate the process can be considered continuous. Intermittent withdrawal of the particles of aggregate, as described, will give them a longer time in the upper or hotter portion of the bin, and therefore will give a longer time for devitrification to take place. This may be desirable for some materials.

The devitrified or calcined aggregate produced by the process described herein is crystalline in structure rather tahn vitreous as is the aggregate previously produced. Thus, the individual particles are harder and can withstand higher temperatures than those previously known.

While in accordance with the provisions of the Statutes I have illustrated and described the best form of embodiment of my invention now known to me, it wll be apparent to those skilled in the art that changes may be made in the form of the apparatus disclosed without departing from the spirit and scope of the invention set forth in the appended claims, and that in some cases certain features of my invention may be used to advantage without a corresponding use of other features.

What is claimed is:

1. Apparatus for making lightweight aggregate comprising a tower furnace having a vertically extending furnace chamber, means to heat said chamber, means to drop material to be heated through said chamber, collecting apparatus into which heated material is collected located below said furnace, said aparatus including a series of conically shaped rings mounted concentrically one beneath the other, said rings decreasing in size the lower they are, conveyor means to move material flowing through said rings from beneath the bottom ring, and means to drive said conveyor means.

2. The combination of claim 1 including a material level detecting device associated with said rings to detect the level of material collected in said apparatus, and means operated by said device to control operation of said means to drive.

3. The combination of claim 1 including means to force a gas through a mass of material collected in said rings.

4. The method of preparing a lightweight aggregate which comprises dropping particles of a clay-like material having the characteristic of bloating when heated through a vertically extending hot furnace, heating said particles to fuse and bloat them, as they fall freely through the furnace, thereby to produce particles having a glass-like, vitreous surface, collecting the heated particles as they leave the furnace, maintaining said particles at the place of collection at a sufficiently high temperature for a sufficient length of time for the particles to devitrify, and removing said particles from the point of collection.

5. The method of claim 4 in which the particles are collected at the top of a column-like mass and removed from the bottom thereof.

6. The method of claim 5 in which the particles are removed continuously from the bottom of the column.

7. The method of claim 5 in which the particles are removed intermittently from the bottom of the column.

* * * * *